United States Patent Office 3,074,315
Patented Jan. 22, 1963

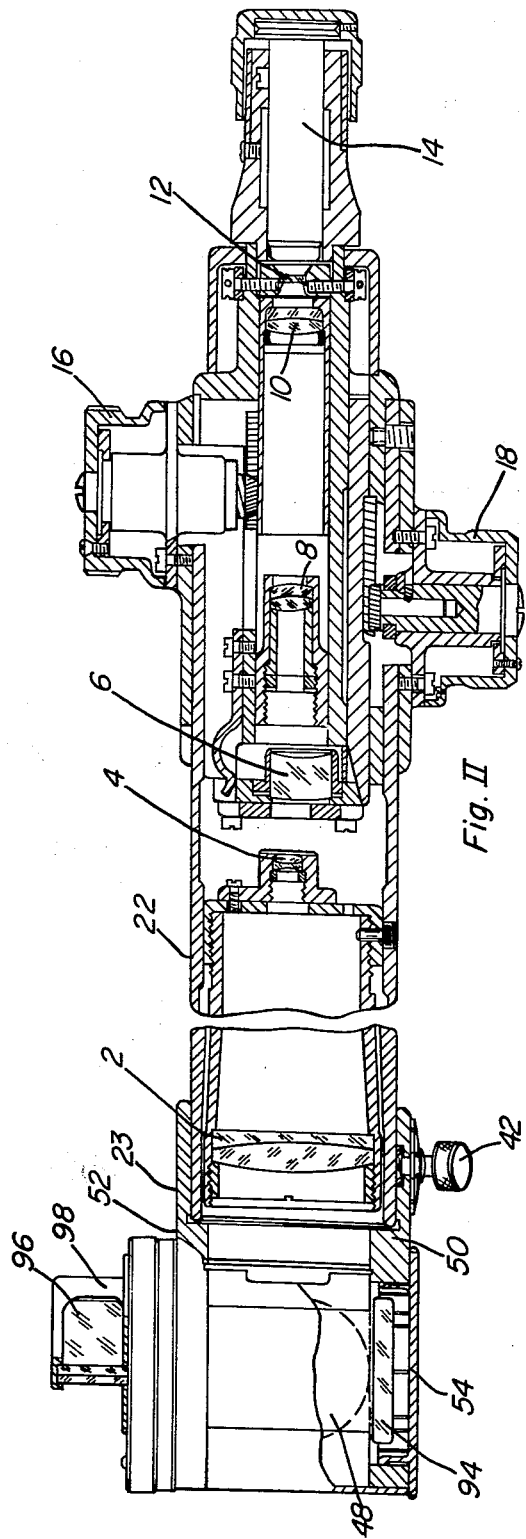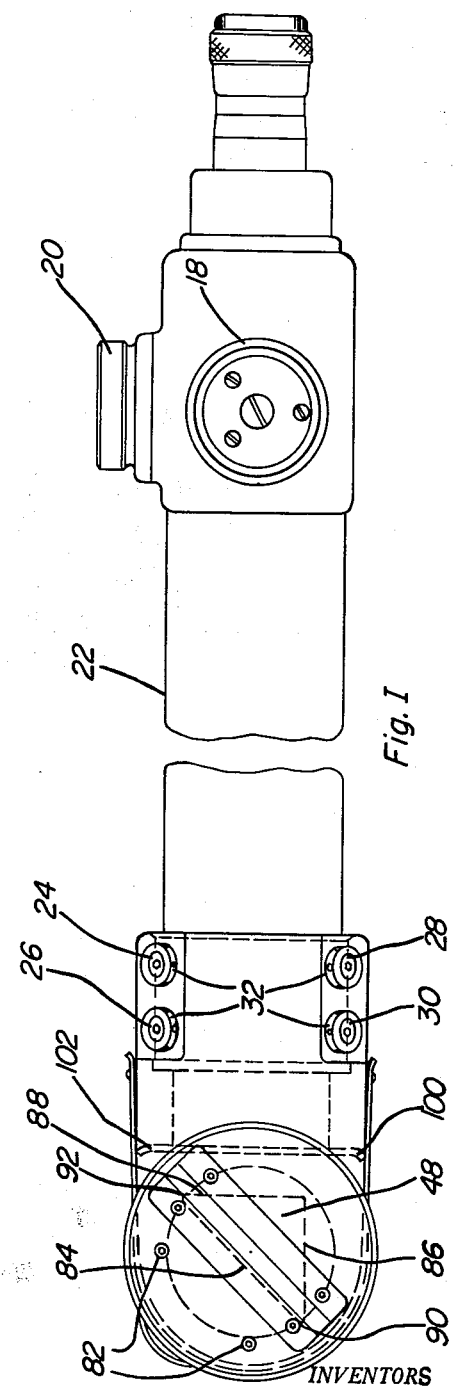
Jan. 22, 1963 — B. H. SEIBEL ET AL — 3,074,315
REFLECTING ATTACHMENT FOR TELESCOPES
Filed Nov. 12, 1958 — 2 Sheets-Sheet 1
INVENTORS
BOBLY H. SEIBEL
CONWAY D. HILLMAN
ATTORNEY + AGENT

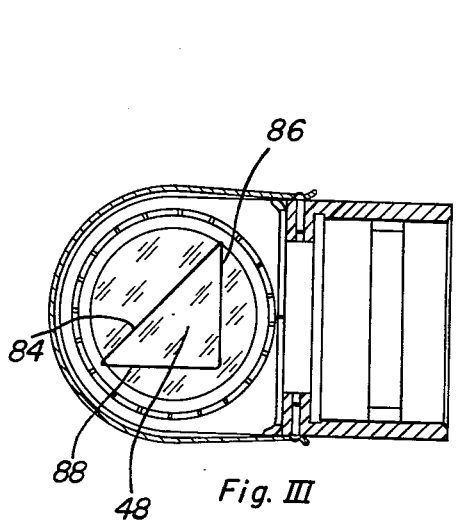
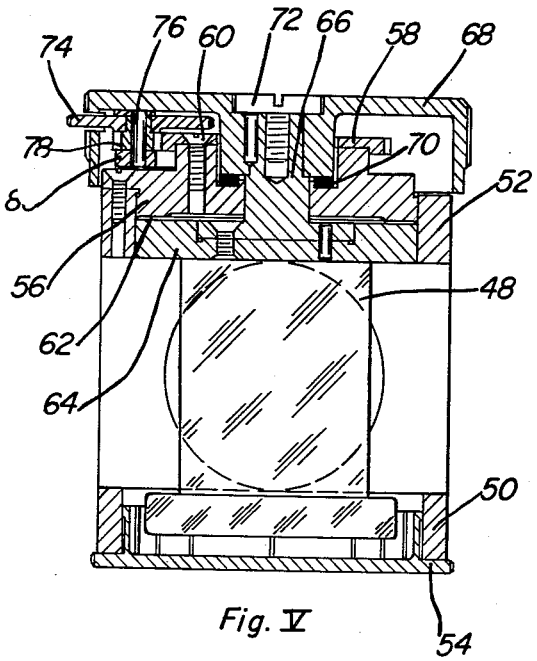
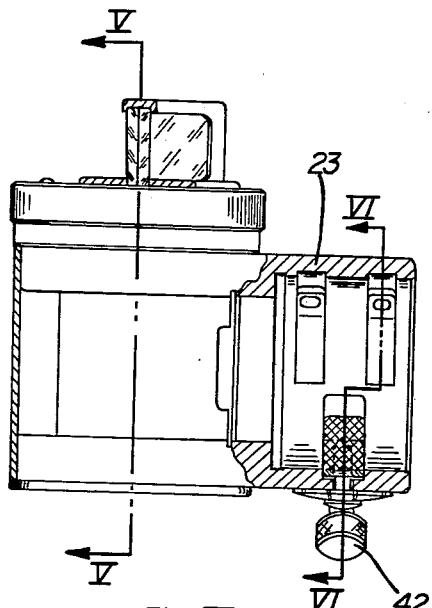
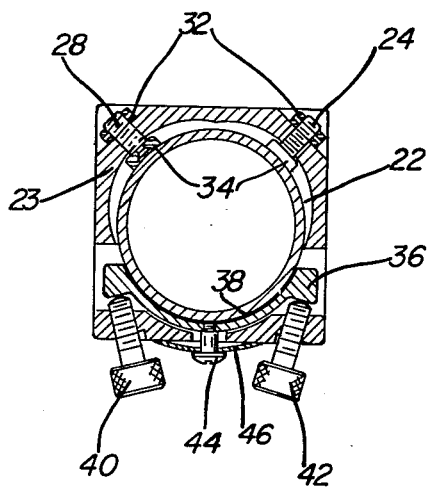

3,074,315
REFLECTING ATTACHMENT FOR TELESCOPES
Bobly H. Seibel, Seattle, Wash., and Conway D. Hillman, Millburn, N.J., assignors to Keuffel & Esser Company, Hoboken, N.J., a corporation of New Jersey
Filed Nov. 12, 1958, Ser. No. 773,233
6 Claims. (Cl. 88—38)

This invention relates to a telescope attachment useful in optical tooling. More specifically it relates to an attachment whereby a prism can be mounted in front of an alignment telescope so that it can be rotated in a manner to cause the telescope to locate points on both sides of the telescope axis in a plane containing the axis of the telescope.

One form of alignment telescope with which the attachment of the present invention is useful is described in Patent 2,784,641 which issued on March 12, 1957. Application, Serial #506,184 filed May 5, 1955, now Patent No. 2,937,560, describes an attachment which can be used with this type of alignment telescope for locating points in a plane perpendicular to the optical axis of the telescope. In contrast to this, the purpose of the present attachment is for locating points in a plane which contains the optical axis of the telescope. Means are also provided for locating this plane perpendicular to the optical axis of another telescope which may be another alignment telescope or the telescope of a jig transit of the like.

Very often in optical tooling operations, an alignment telescope is sighted on a target or collimator to establish a base line of sight. Points in planes perpendicular to this base line of sight can be located by means of the jig transit described in Patent 2,774,275 which issued on Dec. 18, 1956, or by means of the optical square described in application Serial #506,184, now Patent No. 2,937,560, referred to above. However, there are times when it is desirable to locate points in a plane which contains the basic line of sight, for example it may be desirable to locate points in a vertical plane containing the base line of sight.

The attachment of the present invention makes it possible to do this while the operator of the alignment telescope retains the ability to check back on the target which establishes the basic line of sight. If desired, the plane swept by the new attachment can be made perpendicular to the line of sight of another instrument. This technique is useful for example if it is desired to make the plane truly vertical, and is accomplished by making it perpendicular to the line of sight of an optical level which has been previously adjusted to level position.

The objects of the invention discussed in the previous paragraph and others as well as the means for their attainment will be more fully understood after reading the following description taken in conjunction with the accompanying drawings in which:

FIGURE I is a view in side elevation showing the new attachment mounted on an alignment telescope of the type described in Patent #2,784,641.

FIGURE II is a view in enlarged sectional plan taken along the center line of FIGURE I.

FIGURE III is a view in sectional side elevation taken along the center line of the attachment.

FIGURE IV is a view in plan of the new attachment.

FIGURE V is a view in sectional elevation taken along the line V—V in FIGURE IV and looking in the direction of the arrows.

FIGURE VI is a view in sectional elevation taken along the line VI—VI of FIGURE IV and looking in a direction of the arrows.

A complete description of the alignment telescope is given in Patent #2,784,641 and for the sake of brevity this will not be repeated here. In the preferred form described in the patent, the alignment telescope includes a first objective lens 2, a negative lens 4, a displacement lens 6, a second objective lens 8, a focusing lens 10, a reticule 12, and an eyepiece 14 which is not shown in detail. The focusing knob 16 moves the focusing lens 10 to focus the telescope. The micrometer knobs 18 and 20 move the displacement lens 6 in either a horizontal or vertical direction to displace the line of sight with respect to the axis of the tube 22, by an amount which can be measured on a drum on the micrometer knobs. The usefulness of the attachment of the present invention is not limited to an alignment telescope of this particular design but it can be used with equal advantage on any type of alignment telescope.

The attachment, which will be conveniently referred to hereinafter as a planizer, is provided with a portion having an inner generally cylindrical surface which fits over the outside diameter of the alignment telescope tube 22. The planizer is held on to the telescope tube by four screws 24, 26, 28 and 30 which press the shoes 34 against the telescope tube 22 as shown in FIGURE VI. These four screws enable one to adjust the planizer with respect to the telescope tube 22 both angularly and in displacement in two mutually perpendicular planes, passing through the axis of the telescope tube. Lock nuts 32 are provided on each of the screws 24, 26, 28 and 30 for holding them in adjusted position. The telescope tube 22 is held against the shoes 34 by a curved support 36 provided with a friction surface 38 which may for example be obtained by cementing a thin strip of "Teflon" or similar material to the curved surface of the support 36. The curved support 36 is loosely held inside the housing 23 of the planizer by holding screw 44 and a spring washer 46. Two adjusting screws 40 and 42 acting between the housing 23 and the projections on the curved support 36 are provided to adjust the planizer about the axis of the telescope tube 22. During this adjustment the telescope tube 22 slides with respect to the shoes 34. The housing 23 is cut out as indicated in FIGURE VI and the other figures to provide space for the shoes 34, the curved support 36 and the adjustment thereof.

As shown in FIGURE II the housing 23 of the planizer extends in front of the telescope tube in a manner similar to two prongs of a fork between which the prism 48 is mounted. The two prongs of the fork 50 and 52 are rounded at their ends to form semi-circles in the vertical plane. As shown in FIGURE I, both prongs 50 and 52 are also bored out to have cylindrical internal surfaces concentric with the semi-circular ends in the vertical plane. A removable cover 54 fits in this cylindrical internal surface in the prong 50. As shown in FIGURE V, a bearing 56 fits inside the cylindrical inner surface of the prong 52. A gear 58 is secured to the bearing 56 by the screws 60 so as to be concentric therewith. The bearing 56 is also provided with a lower flat surface 62 square with its internal cylindrical bearing surface for locating the prism mount 64. The prism mount 64 is secured to the axle 66 by screws and pinned as shown. The knob 68 is threaded on to the axle 66 and then pinned. A spring washer 70 is provided between the knob 68 and the bearing 56 to hold the prism mount 64 in contact with the lower flat surface of the bearing 56.

The prism 48 is rotated in front of the telescope by means of the rotating knob 68 which is attached to the axle 66 by means of the holding screw 72. The outer surface of this rotating knob 68 is knurled for easy turning by the hand.

For fine adjustment of the angular position of the prism 48, a fine adjustment wheel 74 is mounted within the rotating knob 68 on an axle 76 extending between the face of the knob and a support 80 which straddles the wheel 74 and is secured to the face of the knob 68 by the screws 82 shown in FIGURE 1. The fine adjustment wheel turns a small gear 78 about the axle 76. The small gear 78 meshes with the gear 58 which is fixed with respect to the planizer housing 23 so that the turning of the fine adjustment wheel 74 produces a turning of the rotating knob 68 at a slower speed. The outer edge of the fine adjustment wheel 74 is also knurled for easy movement with one finger.

As shown in FIG. I, the prism is in the form of a prism having an isosceles right angle triangle cross section. However, the invention is not limited to a prism having a right triangle cross section. Any prism having an isosceles triangle cross section would be suitable. It is not even necessary that the two angles of the isosceles triangle be exactly equal provided they are not so unequal as to cause objectional dispersion of light. The surface 84 of the prism 48 between the two acute angles is a reflecting surface. This can be accomplished by a reflecting coating applied to the surface 84 or total reflection can be used provided the index of refraction and size of the acute angles are suitable. If crown glass is used, it will ordinarily be preferable to apply a reflecting coating to the surface 84 because if the acute angles are made large enough to get total internal reflection, the size of the surface 84 will become unduly large. The surfaces 86 and 88 which are inclined oppositely at the acute angles to the surface 84 are light transmitting surfaces which may be provided with an anti-reflection coating. The intersection lines 90 and 92 of the two light transmitting surfaces 86 and 88 with the reflecting surface 84 are parallel and the prism is mounted so that its axis of rotation is parallel to the intersection lines 90 and 92. In order to accomplish this the surface of the prism mount 64 which engages the bearing surface 62 is provided with three equally spaced raised surfaces which engage the surface 62. These raised portions of the surface are hand-lapped until the axis of rotation is parallel to the edges of 90 and 92. In order to assure that the axis of rotation is controlled by the surface 62 the axle 66 turns very freely within the bearing 56 and the spring washer 70 holds the mount 64 against the surface 62.

The manufacture of the prism 48 must be very precise in order that the intersection lines 90 and 92 are parallel within very close limits. Stating it another way the three surfaces of the prism 84, 86 and 88 must be perpendicular to a common plane within very close limits in order that the line of sight of the telescope will not be deviated out of the plane perpendicular to the axis of rotation when the prism is rotated by means of the rotating knob 68.

The prism 48 is mounted so that the axis of rotation falls on a perpendicular drawn from the right apex to the hypotenuse at a distance from the hypotenuse equal to about one third of the distance from the apex to the hypotenuse. It can be shown that this location of the axis of rotation permits the maximum amount of light to pass through the telescope after reflection from the surface 84 when the prism 48 is in the worst light gathering position which happens to be with the surface 84 parallel to the optical axis of the telescope. This location also makes the beam of light passing through the prism as nearly as possible symmetrical with the axis of the alignment telescope.

In the use of the planizer, light from any target located in a plane which contains the optical axis of the telescope and is perpendicular to the axis of rotation of the planizer is refracted by the light transmitting surface 86 to the reflecting surface 84 and then refracted again by the light transmitting surface 88 along the optical axis of the telescope. The only position of the prism 48, assuming a right angle prism is used in which the optical line of sight will not be deviated by the light refracting surfaces 86 and 88, is the one in which these surfaces are perpendicular to the line of sight. In locating points in the half of the plane on the side of the telescope below its optical axis the reflecting surface 84 will always pass above the axis of rotation as shown in FIGURES I and III. In order to locate points in the half of the plane on the side of the telescope above its optical axis, the prism 48 must be turned 180 degrees through a region in which the light passing through the surfaces 86 and 88 and reflected by the surface 84 cannot reach the telescope objective until the reflecting surface 84 passes below the axis of rotation. There is no point in this plane in front of the telescope which cannot be seen. The lower and upper halves of the plane as seen in the two positions of the prism overlap slightly.

The region, in which the prism cannot be used, can be avoided by cementing another prism of similar cross-section to the prism 48 so that their surfaces between the acute angles match exactly. With this arrangement, the axis of rotation should pass through the reflecting surface halfway between the intersection lines 90 and 92. However, this construction reduces the amount of useful light which passes through the telescope and further complicates the manufacture of the optical parts which is already very difficult because of the high precision required.

Two shutters 100 and 102 are mounted in the body of enclosure 23 which can be adjusted to prevent any light which does not pass through the prism 48 from entering the telescope for all positions of the telescope.

In order that the plane swept by the planizer can be made perpendicular to the optical axis of another telescope a reflecting surface is mounted perpendicular to the axis of rotation. In the embodiment shown this is accomplished by securing a mirror 94 to the end surface of the prism 48. This can be accomplished either by cementing or by bringing the two parts into optical contact. The outer surface of the mirror 94 shown in FIG. II is provided with a reflecting coating so that when the cover 54 is removed auto-collimation or auto-reflection can be obtained therefrom to make the plane swept by the planizer perpendicular to the optical axis of another instrument. Alternatively the end surface of the prism 48 may be made very precisely perpendicular to the surfaces 86, 88 and 84 and this surface itself may be provided with a reflecting coating to permit auto-collimation from another instrument for lining up the planizing plane perpendicular to the optical axis of this instrument.

In order to facilitate the location of points in the plane swept by the planizer a locating mirror 96 is mounted on the knob 68 so that its reflecting surface is effectively parallel to the reflecting surface 84 of the prism 48. This is accomplished by means of a mount 98 which is fastened to the face of the knob 68 by screws as shown. In the embodiment shown the mirror 96 is made of a thin strip of glass provided with a reflecting coating and covered with another thin strip of glass cemented over the reflecting coating to act as a protection therefor. The two pieces of glass cemented together with the reflecting coating sandwiched between them fit into the mount 98 as shown. The mirror 96 being located outside of the optical path of the telescope makes it possible to see points without the magnification of the telescope so that they can be located in a rough manner more quickly and then finally brought into the line of sight of the telescope by means of the fine adjustment wheel 74.

The adjustment of the axis of rotation to make it perpendicular to the optical axis of the telescope is accomplished by means of the adjusting screws 24, 26 and 28 and 30 as described above. Optical methods for checking this adjustment will be apparent to those skilled in the art.

If desired, in the case where the prism 48 has a right isosceles triangle cross-section, a portion of the light transmitting surfaces may be provided with a reflecting coating (or the entire surfaces may be provided with a partially reflecting coating) which could be used for aligning the reflecting surface 84 of the prism 48 at 45° to the optical axis of the telescope by auto-collimation. Then the points in the plane located by the planizer and perpendicular to the axis of the telescope could be accurately located. If the telescope with planizer attached were then rotated about its axis any points in the plane perpendicular to the axis of the telescope could be located.

Having thus described the invention what is claimed is:

1. An optical device for mounting in front of a telescope comprising a housing open on at least three sides, a prism having a reflecting surface and two light transmitting surfaces inclined oppositely at acute angles to said reflecting surface, the intersection lines of said light transmitting surfaces with said reflecting surface being parallel, said prism being mounted for rotation about an axis parallel to said intersection lines and perpendicular to the optical axis of said telescope, the line of sight of said telescope being reflected by the reflecting surface of said prism, whereby the rotation of said prism causes said telescope line of sight to turn through the three open sides of said housing to locate points on both sides of said telescope axis in a plane perpendicular to said axis of rotation and a second reflecting surface carried by said prism mounted perpendicular to said axis of rotation, whereby said axis of rotation may be mounted parallel to the line of sight of another telescope sighted perpendicular to said reflecting surface.

2. An optical device for mounting in front of a telescope comprising a housing open on at least three sides, a prism having a reflecting surface and two light transmitting surfaces inclined oppositely at acute angles to said reflecting surface, the intersection lines of said reflecting surfaces being parallel, said prism being mounted for rotation with respect to said telescope about an axis parallel to said intersection lines and perpendicular to the optical axis of said telescope, the line of sight of said telescope passing through said light transmitting surfaces and being reflected by the reflecting surface of said prism, whereby the rotation of said prism causes said telescope line of sight to turn through the three open sides of said housing to locate points on both sides of said telescope axis in a plane perpendicular to said axis of rotation, and an aiming reflector carried with said prism and having a reflecting surface effectively parallel to the reflecting surface of said prism outside the field of said telescope for aiming the device at a predetermined target.

3. An optical device for mounting in front of a telescope, comprising a housing open on at least three sides, a prism having two reflecting and two light transmitting surfaces inclined oppositely at acute angles to the first of said reflecting surfaces, the intersection lines of said light transmitting surfaces with the first of said reflecting surfaces being parallel, said prism being mounted for rotation about an axis parallel to said intersection lines and perpendicular to the optical axis of said telescope, the line of sight of said telescope being reflected by the reflecting surface of said prism, whereby the rotation of said prism causes the line of sight of said telescope to turn through the three open sides of said housing and to sweep a plane perpendicular to said axis of rotation, the second of said reflecting surfaces being perpendicular to the other three surfaces and to the axis of rotation, whereby said axis of rotation may be mounted parallel to the line of sight of another telescope sighted perpendicular to the second of said reflecting surfaces.

4. An optical device for mounting in front of a telescope, comprising a prism having a reflecting surface and two light transmitting surfaces with the lines of intersection of said surfaces being parallel, mounting means for adjustably and rotatably mounting said prism on said telescope with said prism having its axis of rotation parallel to said lines of intersection of said surfaces and perpendicular to the optical axis of said telescope, whereby rotating said prism causes the line of sight of said telescope to sweep a plane containing said telescope optical axis perpendicular to said prism axis of rotation, and a second reflecting surface mounted coaxially with said prism on said mounting means and being normal to said prism axis of rotation, whereby said prism axis of rotation can be aligned parallel to another line of sight perpendicular to said second reflecting surface.

5. An optical device for mounting in front of a telescope, comprising a prism having a reflecting surface and two light transmitting surfaces with the lines of intersection of said surfaces being parallel, mounting means for adjustably and rotatably mounting said prism on said telescope with said prism having its axis of rotation parallel to said lines of intersection of said surfaces and perpendicular to the optical axis of said telescope, whereby rotating said prism causes the line of sight of said telescope to sweep a plane containing said telescope optical axis perpendicular to said prism axis of rotation, and a second reflecting surface mounted on said prism normal to said prism axis of rotation, whereby said prism axis of rotation can be aligned parallel to another line of sight perpendicular to said second reflecting surface.

6. An optical device for mounting in front of a telescope, comprising a prism having two ends, a reflecting surface, and two light transmitting surfaces with the lines of intersection of said surfaces being parallel; and mounting means for adjustably and rotatably mounting said prism on said telescope with said prism having its axis of rotation parallel to said lines of intersection of said surfaces and perpendicular to the optical axis of said telescope, whereby rotating said prism causes the line of sight of said telescope to sweep a plane containing said telescope optical axis perpendicular to said prism axis of rotation, one of said ends being a second reflective surface perpendicular to said parallel lines of intersection, whereby said prism axis of rotation can be aligned parallel to another line of sight perpendicular to said reflecting surface end of said prism.

References Cited in the file of this patent

UNITED STATES PATENTS

| | | |
|---|---|---|
| 575,215 | Davis | Jan. 12, 1897 |
| 595,527 | Cordeiro | Dec. 14, 1897 |
| 620,427 | Davis | Feb. 28, 1899 |
| 1,520,245 | Humbrecht | Dec. 23, 1924 |
| 2,385,978 | Flint | Oct. 2, 1945 |
| 2,719,457 | Tripp | Oct. 4, 1955 |
| 2,774,275 | Keller | Dec. 18, 1956 |
| 2,818,773 | Bouwers | Jan. 7, 1958 |

FOREIGN PATENTS

| | | |
|---|---|---|
| 736,537 | France | Sept. 19, 1932 |